(12) United States Patent
Choi

(10) Patent No.: US 6,744,722 B2
(45) Date of Patent: Jun. 1, 2004

(54) OPTICAL PICKUP ACTUATOR

(75) Inventor: In Ho Choi, Seongnam (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 09/985,429

(22) Filed: Nov. 2, 2001

(65) Prior Publication Data

US 2002/0054559 A1 May 9, 2002

(30) Foreign Application Priority Data

Nov. 4, 2000 (KR) .................................... 2000/65354

(51) Int. Cl.⁷ ................................................ G11B 7/09
(52) U.S. Cl. ..................... 369/244; 369/44.16; 359/824
(58) Field of Search ................................ 369/215, 219, 369/244, 247, 44.14, 44.15, 44.16, 44.22; 359/814, 823, 824

(56) References Cited

U.S. PATENT DOCUMENTS

| | | | | |
|---|---|---|---|---|
| 5,313,334 A | * | 5/1994 | Tomiyama et al. | 359/824 |
| 5,373,496 A | * | 12/1994 | Tomita et al. | 369/219 |
| 5,467,328 A | * | 11/1995 | Murakami et al. | 369/44.16 |
| 5,511,049 A | * | 4/1996 | Goda | 369/44.15 |
| 5,535,059 A | * | 7/1996 | Mitsumori et al. | 359/813 |
| 5,541,899 A | * | 7/1996 | Kume et al. | 369/44.14 |
| 5,555,228 A | * | 9/1996 | Izuka | 369/44.15 |
| 6,330,120 B1 | * | 12/2001 | Shibusaka et al. | 359/814 |
| 6,608,802 B1 | * | 8/2003 | Maeda et al. | 369/44.15 |

FOREIGN PATENT DOCUMENTS

| | | | |
|---|---|---|---|
| JP | 11-203697 | * | 7/1999 |
| JP | 2000-11440 | * | 1/2000 |

* cited by examiner

Primary Examiner—David Ometz
(74) Attorney, Agent, or Firm—Birch, Stewart, Kolasch & Birch, LLP

(57) ABSTRACT

In an optical pickup actuator recording or reproducing information onto an optical disc, the optical pickup actuator includes a lens holder installed an object lens focusing an optical beam onto an information recording surface of an optical disc and having a hole at the center portion, focusing/tilt operating means installed inside the hole of the lens holder and generating magnetic force so as to operate the lens holder in a focusing or tilt direction and tracking operating means respectively installed at the right and the left sides of the lens holder and generating magnetic force in order to operate the lens holder in a tracking direction, accordingly it is possible to perform a radial tilt movement with a focusing and a tracking movements and obtain a thinner optical pickup apparatus.

10 Claims, 10 Drawing Sheets

OPTICAL PICKUP ACTUATOR

BACKGROUND OF THE INVENTION

1. Field of the Invention

The present invention relates to an optical pickup actuator recording or reproducing information onto an optical disc, and in particular to an optical pickup actuator which is capable of performing a tracking movement with a focusing and a tilt movements.

2. Description of the Conventional Art

Generally, an optical pickup apparatus includes an optical pickup actuator as an object lens focusing an optical spot of an optical beam at the center of a signal track of an optical disc by corresponding to a surface vibration and eccentricity of the optical disc in accordance with rotation of the optical disc.

The optical pickup actuator operates in order to make the object lens perform a focusing and a tracking movements.

Herein, the focusing movement is moving an object lens up and down in order to make an optical spot of an optical beam of the object lens place within a depth of focus on a signal track of an optical disc, and the tracking movement is moving the object lens right and left in order to make the optical spot of the optical beam of the optical lens follow the center of the signal track.

Accordingly, the optical pickup actuator follows the center of the signal track of the optical disc by moving the object lens up and down (focusing servo), right and left (tracking servo) according to a current flowing on a coil and an electromagnetic force between magnets.

FIGS. 1, 2, 3 schematically illustrate an optical pickup actuator in accordance with the conventional art.

As depicted in FIG. 1 illustrating the optical pickup actuator in accordance with the conventional art in the information recording aspect, the optical pickup actuator in accordance with the conventional art includes an object lens 2 focusing an optical beam from a laser diode light source at an information recording surface of an optical disc, a bobbin 4 supporting the object lens 2, two magnets 6 respectively placed at the front and the rear of the bobbin 4, a yoke 8 placed at the rear of the magnet 6 and preventing leakage of magnetic flux from the rear of the magnet 5, a tracking coil 10 placed at the exterior of the bobbin 4 so as to be corresponded to the magnet 6 and a focusing coil 12 wound around the bobbin 4 so as to be at right angles to the tracking coil 10

The optical pickup actuator in accordance with the conventional art performs the focusing movement and the tracking movement by having the tracking coil 10 and the focusing coil 12 within a magnetic space formed with the magnet 6 and the yoke 8 and moving the object lens 2 up-down and right-left by Lorentz force of Fleming's left-hand law.

In more detail, as depicted in FIG. 2 illustrating the optical pickup actuator in accordance with the conventional art taken along the line A—A of FIG. 1, a magnetic circuit of the actuator for performing the focusing movement is constructed with the focusing coil 12, the magnet 6 magnetized to form a NS and the yoke 8 placed at the rear of the magnet 6.

Herein, a line of magnetic flux is generated in a horizontal axis direction, and the direction of power N operating the optical pickup actuator works in up and down directions, accordingly the focusing movement is performed.

In addition, as depicted in FIG. 3 illustrating the optical pickup actuator taken along the line B—B of FIG. 1, the magnetic circuit of the optical pickup actuator for the tracking movement is constructed with the magnet 6 magnetized to form N, S polar and the tracking coil 10 placed horizontally at both sides of the magnet 6 on the boundary surface of the magnet 6.

Herein, the line of magnetic flux is generated in a direction vertical to the ground, and the power N operating the optical pickup actuator works in the right and left directions according to the direction of the current I applied to the tracking coil 10, accordingly the tracking movement can be performed.

And, as depicted in FIG. 1, the pickup actuator further includes a wire spring 14 and a PCB (printed circuit board) 48 mechanically connected to a fixed part (not shown) by having a fixation point at the right and left sides of the bobbin 4.

As described above, the optical pickup actuator in accordance with the conventional art operated by the magnetic force generated in the magnetic circuit and working in the up-down (focusing) and left-right (tracking) directions performs the focusing movement and the tracking movement by performing the up-down movement and the left-right movement on the basis of the front end portion of the wire spring 14 fixed to the fixed part.

According to the thinness trend of the optical pickup system, in the optical pickup actuator in accordance with the conventional art, it is difficult to form a magnetic circuit on a light path of the laser diode light source.

In the meantime, as described in FIG. 4 illustrating another optical pickup actuator in accordance with the conventional art, the magnetic circuit is constructed so as to avoid the light path of the light source.

In more detail, as depicted in FIG. 4, another optical pickup actuator in accordance with the conventional art includes an object lens 34 focusing a light beam from a light source on an information recording surface of an optical disc, a lens holder 35 supporting the object lens 34, magnets 38 placed inside the lens holder 36, yokes 40 placed at the rear of the magnets 38 and preventing leakage of magnetic flux from the rear of the magnets 38, a tracking coil 42 installed at the lens holder 36 so as to be corresponded to the magnets and a focusing coil 44 wound around the inside diameter of the lens holder 36 so as to be at right angles to the tracking coil 42.

And, another optical pickup actuator in accordance with the conventional art further includes a wire spring 46 and a PCB 48 (printed circuit board) placed at the right and left sides of the lens holder 36, supplying a current to the tracking coil 42 and the focusing coil 44 and supporting the lens holder 36.

Herein, the lens holder 36 has a protrusion portion 36b in which the object lens 34 is fixed in order to avoid a light path from the light source, and rectangular holes 36a, 36a' are formed at the lens holder 36 in order to place the magnets 38 and the yokes 40 at the center portion of the lens holder 36.

As depicted in FIG. 4, in another optical pickup actuator in accordance with the present invention, the up-down movement and the right-left movement of the lens holder 36 according to the tracking movement and the focusing movement are biaxial-operated on the basis of the end portion of the wire spring 46.

However, in the optical pickup actuator projecting the object lens 34, because the magnet 38, the yoke 40 and the tracking coil 42, etc. for the focusing and the tracking movements are inserted into the holes 36a, 36a' of the lens holder 36, a resonance point is lowered in high frequency characteristics. And, because the object lens 34 is installed at the protrusion portion 36b, the fixation point of the wire spring 46 becomes far off from the object lens 34, accordingly unstable movement can occur in a high speed mode.

In addition, in the optical pickup actuator in accordance with the conventional art projecting the object lens 34, because a separation distance of an excitation force center of the tracking and an excitation force center of the focusing divided into the upper and lower parts is relatively long, a resonance point is lowered and vibration characteristics in the surface direction are bad.

In the meantime, a higher accuracy is required for the optical pickup actuator and a tilt margin of the actuator is gradually lowered in the operation of the actuator, it is impossible to satisfy an optical tilt permissive error by the conventional assembly method.

Accordingly, in the recent optical pickup actuator, besides the focusing and tracking biaxial servo, a triaxial actuator following disturbance about a radial tilting and operable on three axes is required.

According to the thin trends of product such as a portable computer, because of limitation conditions as overlapping the light path and the actuator, in the conventional biaxial actuator forming a magnetic circuit is avoided as depicted in FIG. 1, and the object lens is projected so as to separate from the light path as depicted in FIG. 4, in the structure of FIG. 4, constructing a magnetic circuit for tilt operation is more difficult.

In the meantime, in the optical pickup actuator adapting a wire method performing a biaxial linear motion and a plate spring method in accordance with the conventional art, in order to decrease a height of the optical pickup, the light path from the laser diode light source has to be constructed on a same flat surface with the optical pickup actuator.

In this case, because a magnetic circuit such as a magnet, a focusing coil, a tracking coil, etc. for the focusing movement and the tracking movement exists on the light path from the laser diode, it is difficult to thin the actuator.

SUMMARY OF THE INVENTION

Accordingly, it is an object of the present invention to provide an optical pickup actuator which is capable of performing a radial tilt movement with a focusing and a tracking movements and thinning an optical pickup apparatus by placing a focusing/tilt operating magnetic circuit at the center portion and placing a tracking operating magnetic circuit at the right and the left portions.

In order to achieve the above-mentioned object, an optical pickup actuator in accordance with the present invention includes a lens holder having an object lens focusing an optical beam on an information recording surface of an optical disc and having a hole at the center portion, a focusing/tilt operating means placed inside the hole of the lens holder and generating a magnetic force so as to operate the lens holder in a focusing or a tilt direction and a tracking operating means respectively installed at the right and left sides of the lens holder and generating a magnetic force so as to operate the lens holder in the tracking direction.

The lens holder has a protrusion portion so as to be installed the object lens, and wire springs 60 are connected between the both sides of the protrusion portion 52a and supporting means.

In an embodiment of the present invention, the focusing/tilt operating means includes a first magnet fixed inside the hole of the lens holder and a focusing coil fixed to a pickup base, projected inside the hole of the lens holder and mutually operating with the first magnet.

In addition, the tracking operating means includes a second magnet respectively fixed to the right and the left sides of the lens holder and tracking coils installed at a yoke of the pickup base so as to correspond to the second magnet.

Herein, the first magnet and the second magnet are made of one of neodymium (Nd), sintered magnet and plastic magnet.

The first magnet is constructed as a pair, and the magnet faces each other inside the hole of the lens holder and is installed so as to be parallel with the track direction.

The focusing coil is constructed as a pair divided into the right and the left directions between the pair of first magnets, and each focusing coil has a rectangular ring shape.

The pair of focusing coil are parallel-connected each other and respectively and independently generate power in up and down directions according to applied power.

In addition, the pair of first magnets are magnetized to form a multipolar magnetization in the upper and lower directions and magnetized in the front and back, accordingly a line of magnetic flux in different directions is generated by the pair of focusing coils corresponded each other.

The pair of focusing coils divide and interlink a coil placed at the other polar and having magnetic flux in the same direction in order to be offset each other.

The second magnet is magnetized to form a unipolar magnetization, the tracking coil is formed so as to have a rectangular ring shape and has a size in which the second magnet is insertable.

In addition, in accordance with another embodiment of the present invention, the focusing/tilt operating means includes a first magnet fixed inside the hole of the lens holder, a focusing coil fixed to a pickup base, projected inside the hole of the lens holder and generating the operating force in the focusing direction by mutually working with the first magnet and tilt coils divided into right and left portions so as to be parallel with the focusing coil and generating the operating force in a radial tilt direction.

In addition, the tracking operating means includes second magnets respectively fixed to the right and the left sides of the lens holder and tracking coils installed at a yoke of the pickup base.

Herein, the first magnet, the focusing coil, and the tilt coils are arranged so as to be parallel each other, and the tilt coil is constructed as a pair and the current is applied in different directions.

The tracking coil has a rectangular ring shape and has a size in which the second magnet is insertable.

In addition, in yet another embodiment of the present invention, the focusing/tilt operating means includes focusing coils fixed inside the hole of the lens holder and a first magnet fixed to a pickup base, placed inside the lens holder and mutually working with the first magnet.

The tracking operating means includes tracking coils wound around the right and left sides of the lens holder and performing the tracking operation and second magnets fixed to the yoke placed at the right and the left sides of the lens holder so as to be corresponded to the tracking coils.

Herein, the focusing coil is constructed as a pair divided into the right and the left portions inside the hole of the lens holder.

The pair of focusing coils are connected so as to be parallel each other and generate respectively and independently the power in the up and down directions.

DETAILED DESCRIPTION OF THE PREFERRED EMBODIMENT

Hereinafter, embodiments of an optical pickup actuator in accordance with the present invention will now be described with reference to accompanying drawings.

Figure 1:
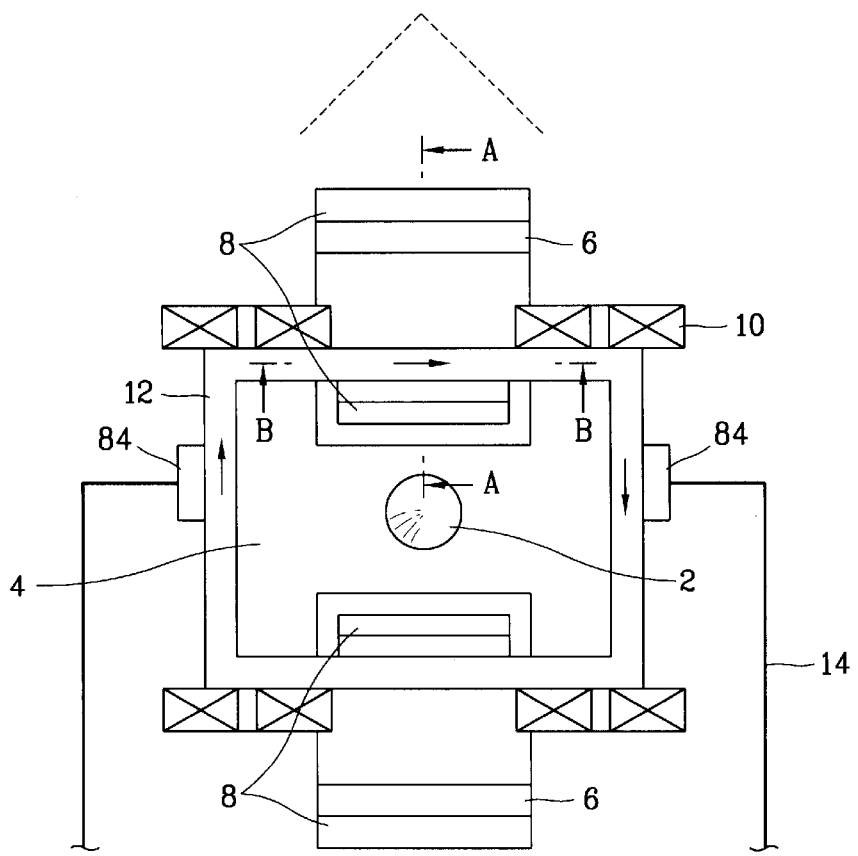
FIG. 1 is a schematic plan view illustrating an optical pickup actuator in accordance with the conventional art.
Figure 2:
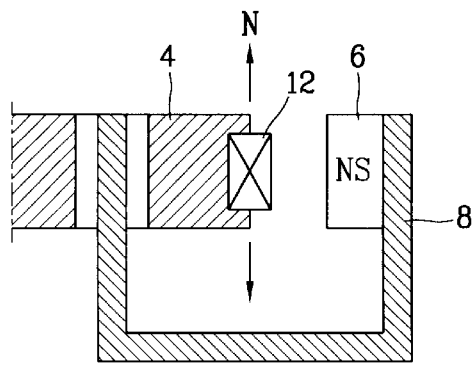
FIG. 2 is a schematic sectional view illustrating the optical pickup actuator taken along the line A—A of FIG. 1.
Figure 3:
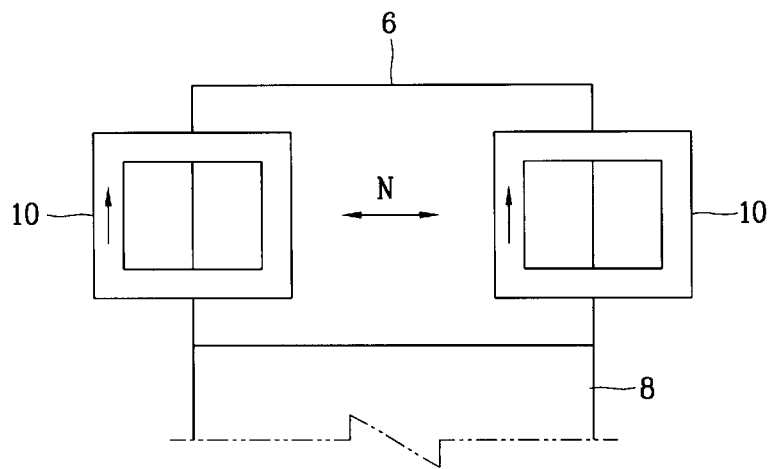
FIG. 3 is an arrangement plan illustrating coils taken along the line B—B of FIG. 1.
Figure 4:
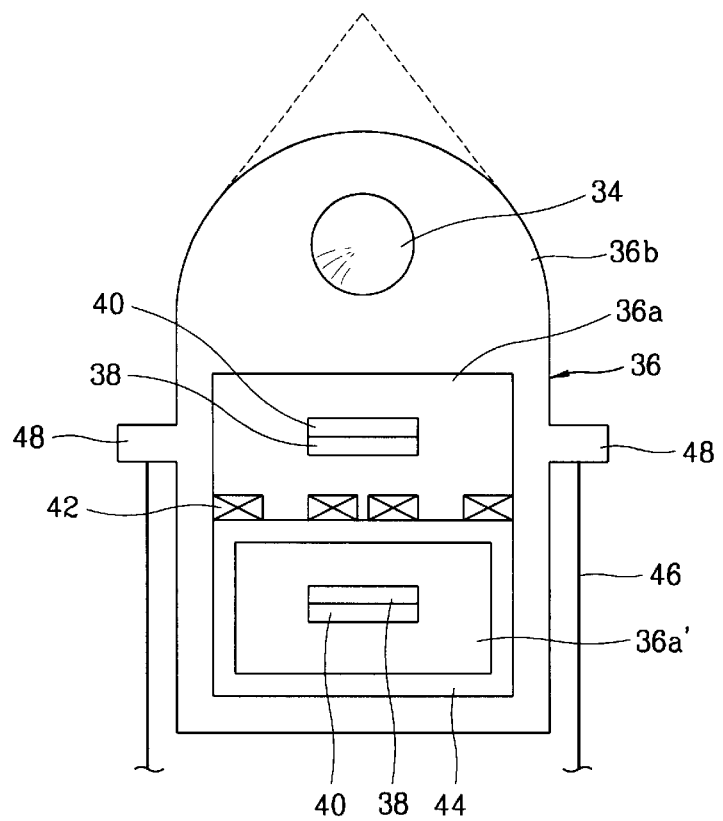
FIG. 4 is a schematic plan view illustrating another optical pickup actuator in accordance with the conventional invention.
Figure 5:
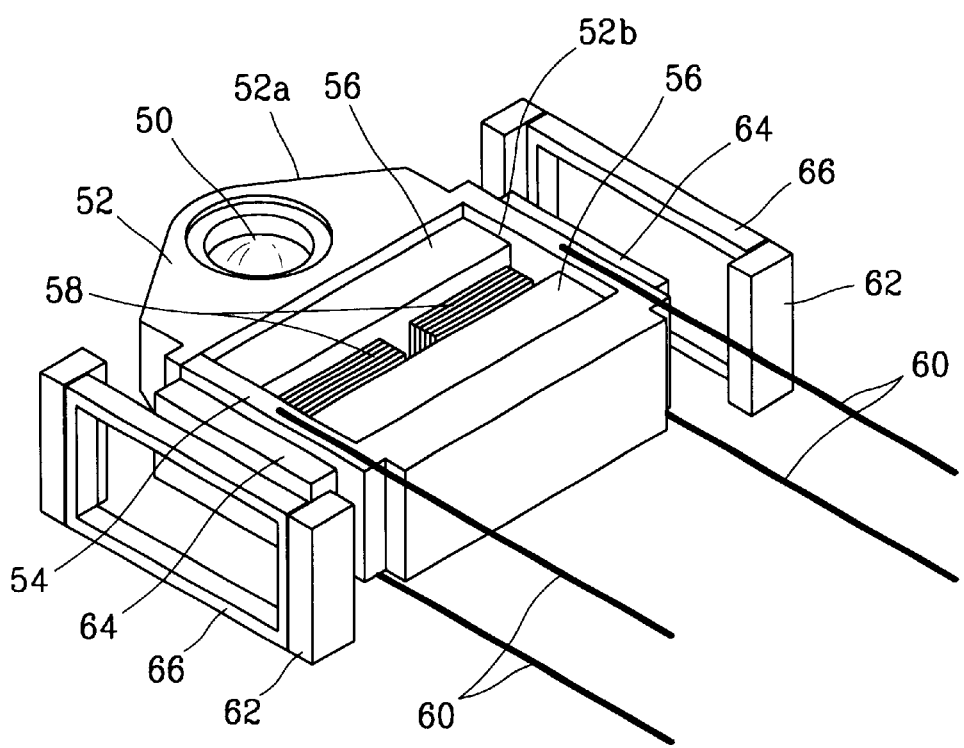
FIG. 5 is a perspective view illustrating an optical pickup actuator in accordance with a first embodiment of the present invention.

FIG. 5 is a perspective view illustrating an optical pickup actuator in accordance with a first embodiment of the present invention.

As depicted in FIG. 5, an optical pickup actuator in accordance with the present invention includes an object lens 50 focusing an optical bean from a light source on an information recording surface of an optical disc, a lens holder 52 having a protrusion portion 52a in which the object lens 50 is inserted and fixed, a pair of first magnets 56 and focusing coils 58 inserted into the hole 52b of the lens holder 52 and generating a magnetic force in different vertical directions, a pair of second magnets 64 placed at the right and the left sides of the lens holder 52 and generating the magnetic force for the tracking movement and a pair of tracking coils 66 and yokes 62 corresponded to the second magnets 64.

The pair of first magnets 56 constructing the focusing magnetic circuit are installed so as to be corresponded to the hole 52b of the lens holder 52 and operated with the lens holder 52, and the pair of focusing coils 58 are respectively installed at a pickup base (not shown) so as to place at the right and the left sides on the basis of the hole 52b.

The pair of second magnets 64 are respectively fixed to the right and the left sides of the lens holder 52 for symmetry with an excitation force center of the focusing, and the pair of tracking coils 66 are respectively fixed to the yoke 62 so as to be corresponded to the pair of second magnets 64.

And, fixed parts 54 are formed at the both sides of the lens holder 52 for power supply, and a wire spring 64 is mechanically connected to the fixed parts 54 in order to support the lens holder 52 so as to perform the up-down movement (focusing) and the right-left movement (tracking) according to the focusing and tracking movements.

The construction and operation of the optical pickup actuator in accordance with the first embodiment of the present invention will be described in detail.

In the optical pickup actuator in accordance with the present invention, the object lens 50 is installed at a protrusive portion 52a of the lens holder 52 projected from the light path, and the pair of first magnets are fixed inside the hole 52b of the lens holder 52 and move along with the lens holder 52.

And, the pair of focusing coils 58 are respectively fixed to the pickup base between the pair of first magnets 56 so as to be parallel with the pair of first magnets inside the hole 52b of the lens holder 52. The pair of focusing coils 58 are divided into the right and the left portions and make possible to perform the focusing movement and the radial tilt movement according to the direction of the applied current.

In more detail, in order to make possible to perform the focusing and the radial tilt, the pair of first magnets 56 are magnetized to form a multipolar magnetization as "NS" in the upper and low direction and in the front and back, and the pair of focusing coils 58 are formed so as to have a rectangular ring shape so as to be corresponded to the pair of first magnets 58, accordingly the upper and lower surfaces of the focusing coils 58 can be used.

Herein, the pair of first magnets 56 and the pair of focusing coils 58 construct a magnetic circuit at the center portion of the lens holder 52 so as to be parallel with the track direction and reduce a nonlinearity of the radial.

Accordingly, the pair of first magnets 56 are included in the operating unit with the lens holder 52, the pair of focusing coils 58 perform the fixed part function, accordingly it is possible to excite the lens holder 52 with the focusing and radial tilt movement modes according to the focusing and the tilt magnetic circuit construction.

The operation of the optical pickup actuator in accordance with the first embodiment of the present invention will be described in detail with reference to accompanying FIGS. 6A~6D.

Figure 6A:
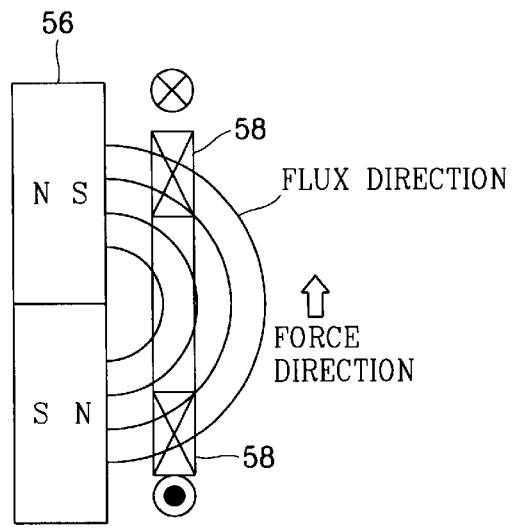
FIGS. 6A, 6B, 6C and 6D illustrate a focusing and a radial tilt movements of the optical pickup actuator of FIG. 5.
Figure 6B:
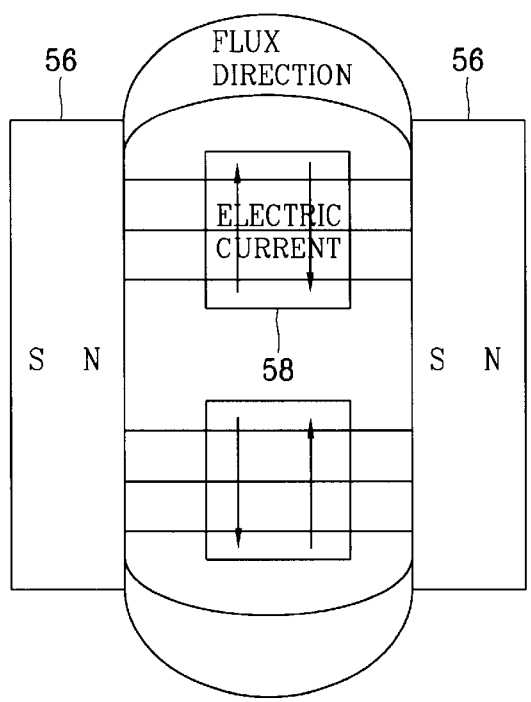
Figure 6C:
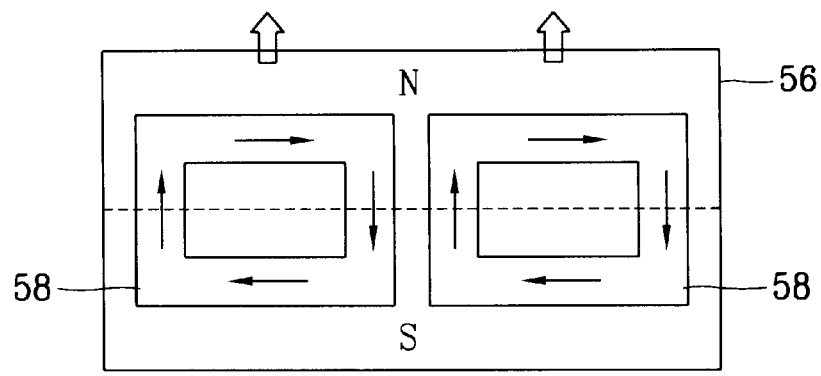
Figure 6D:
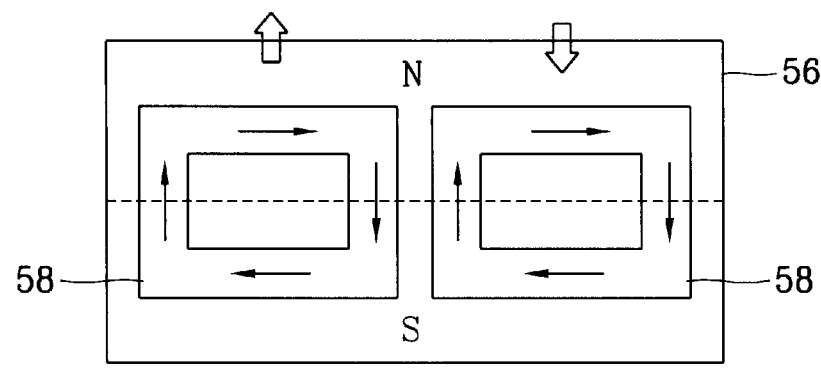

FIGS. 6A, 6B, 6C and 6D illustrate a focusing and a radial tilt movements of the optical pickup actuator of FIG. 5. FIG. 6A is a side view illustrating the magnetic flux in the track direction, FIG. 6B is a plan view illustrating a magnetic flux in the focus direction, and the FIGS. 6C and 6D are front views illustrating the focus and the radial tilt movements.

As depicted in FIGS. 6A and 6B, the pair of first magnets 56 are magnetized in the upper and lower direction as "N:S", "S:N", magnetized in the front and back as "SN", the upper and lower surfaces of each focusing coil 58 are corresponded each other.

In addition, as depicted in FIGS. 6C and 6D, when power having a different current direction is applied to each focusing coil 58, each focusing coil generates power in the upper and lower directions.

In more detail, as depicted in FIG. 6C, when the current flows to the pair of focusing coils 58 in the same direction, the movement in the focusing direction is performed, as depicted in FIG. 6D, when the current flows to the pair of focusing coils 58 in different directions, opposite power in the upper and lower directions is generated, accordingly the radial tilt operation can be performed.

And, in the right and the left sides of each focusing coil 58, the fluxes are offset each other, because the magnetic flux in the different pole divides and interlinks the pair of focusing coils 58 in the same direction.

As described above, by using the magnetic flux at the upper and lower surfaces of the focusing coil 58, the efficiency of the coil is improved, the sensitivity is improved by the operation in the radial direction, the focusing coil 58 is controlled from the two directions at the same time, accordingly it is efficient in the mechanical aspect.

Because the focusing and the tilt magnetic circuit are magnetized to form a multipolar magnetization in the upper and lower directions and two magnets 56 are placed so as to face each other with same polar, by shortening a length in a gap direction with the simple construction removing an inner yoke for magnetic flux path, the excitation focus center of the focusing and radial, the fixation point of the wire spring 64 and the weight center point of the actuator are placed so as to be close to the object lens 50 at the most, and a high frequency resonance point of the object lens 50 of the lens holder 52 can be enlarged.

In addition, by placing the focusing and tilt magnetic circuit at the center portion of the lens holder 52 so as to be separated from the tracking magnetic circuit, the construction size of the magnetic circuit for the operation of the lens holder 52 can be reduced, and a stiffness of the whole lens holder can be improved by decreasing a diameter of the hole of the lens holder 52.

Figure 7A:
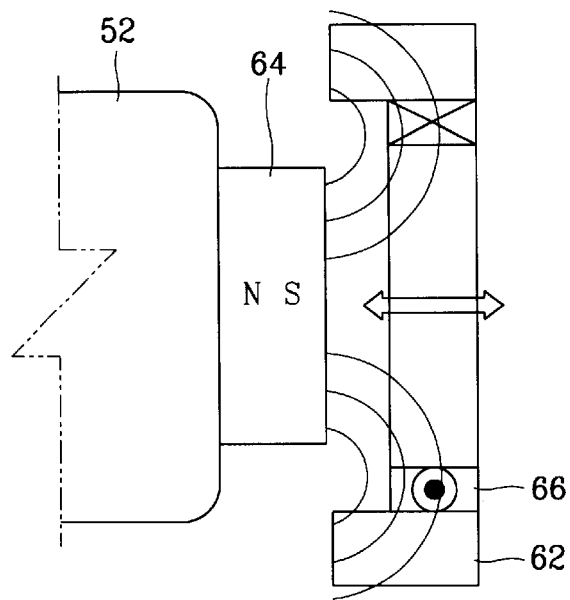
FIGS. 7A and 7B illustrate a tracking movement of the optical pickup actuator of FIG. 5.
Figure 7B:
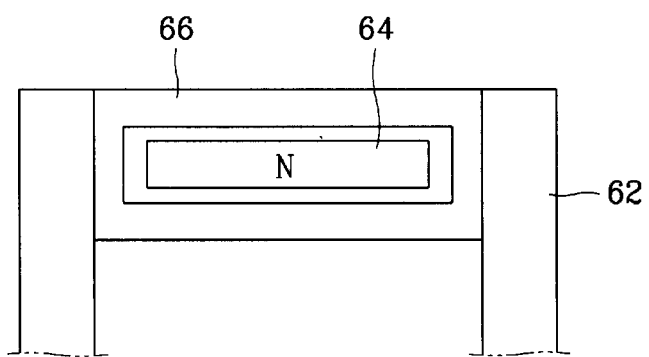

In the meantime, as depicted in FIGS. 7A and 7B, the tracking magnetic circuit constructed with the second magnets 64 and the tracking coils 66 are placed at the right and the left sides of the lens holder 52.

In more detail, each unipolar magnetized second magnet 64 is installed at the right and the left sides of the lens holder 52, each tracking coil 66 is placed at the outside of the second magnets 64 so as to be opposite each other. Herein, the tracking coils 66 form a ring and are fixed between the yokes 62, and the size of inner circumference of the tracking coil 66 is same as the outer circumference of the second magnets 64 or bigger than that.

As depicted in FIG. 7A, in the operation of the tracking magnetic circuit, the tracking coil 66 generates power by utilizing power in the magnet flux generated in the second magnet 64 and the magnet flux generated between the polar of the tracking coils 66.

Then, the tracking coil 66 or the second magnet 64 perform the tracking movement at the surface opposite to the lens holder 52. The tracking movement is performed by the power generated in the right and the left according to the direction of the current flowing on the tracking coil 66 placed at a separation point between the polar by using the parallel direction of the magnetic flux.

Accordingly, when the current is applied to the tracking coil 66, in the line of magnetic flux parallel with the magnetic polar surface and the line of magnetic flux returned between the magnetic polar, power is generated in the right side by the magnetic flux returned at the separation point, and power is generated in the left side by the inversion of the polarity of the current.

Herein, the yoke 62 installed at the both sides of the tracking coil 66 is magnetized by the magnetic flux returned between the polar and magnifies the magnetic flux.

And, a depicted in FIG. 7B, in the tracking movement of the lens holder 52, the second magnets 64 can come into the center portion of the tracking coil 66 while performing the right and the left transferring, accordingly a mechanical space by the operation range of the lens holder 62 can be decreased.

As described above, the tracking magnetic circuit constructed with the second magnet and the tracking coil can generate higher efficiency and request operation power by operating the tracking coil 66 placed at the four surfaces of the lens holder 52 in the one direction.

And, each tracking coil 66 generates power by being installed at the both sides of the polar separation point from the center portion so as to be parallel each other, and the excitation focus point of the tracking coil 66 coincides with the excitation focus point of the focusing coil 58, the focus point of the actuator and the fixation point of the wire spring 64.

Each tracking magnetic circuit (the second magnet and the tracking coil) is placed at the right and the left sides of the lens holder 52 so as to be corresponded to each other with the magnet 64 and the coil 66 corresponded to one to one at the side of the lens holder 52, accordingly the tracking operation is symmetric in the right and the left directions.

And, as depicted in FIG. 5, the front end of the wire spring 60 is fixed to the upper, lower surfaces or the right and left surfaces of the fixed part 54 placed at the upper and lower surfaces of the lens holder 52 in the tracking direction by a welding or an adhesive method, the second magnets 56 are installed at the lens holder sides, accordingly there is no problem in power supply and it facilitates the assembly.

In addition, by coinciding the focusing, radial and the tracking operation point with the one point, namely, the mass central point of the lens holder, it is advantageous in the vibration characteristics.

In addition, by constructing the first magnet 56 and the second magnet 64 in the lens holder as the moving part, there is no need to connect power to the moving part, power is connected to the fixed part, it facilitates the assembly.

And, when the first magnet 56 and the second magnet 64 are constructed in the moving part, in order to reduce the weight of the magnets 56, 64, a neodymium (Nd), sintered magnetic or a plastic magnet can be used.

In the meantime, each tracking coil 66 can be directly wound around the projected inner diameter of the lens holder 52 with jig or fixed to the fixed part, and the tracking magnet can be assembled with the fixed part or the moving part, accordingly it facilitates the assembly.

Figure 8:
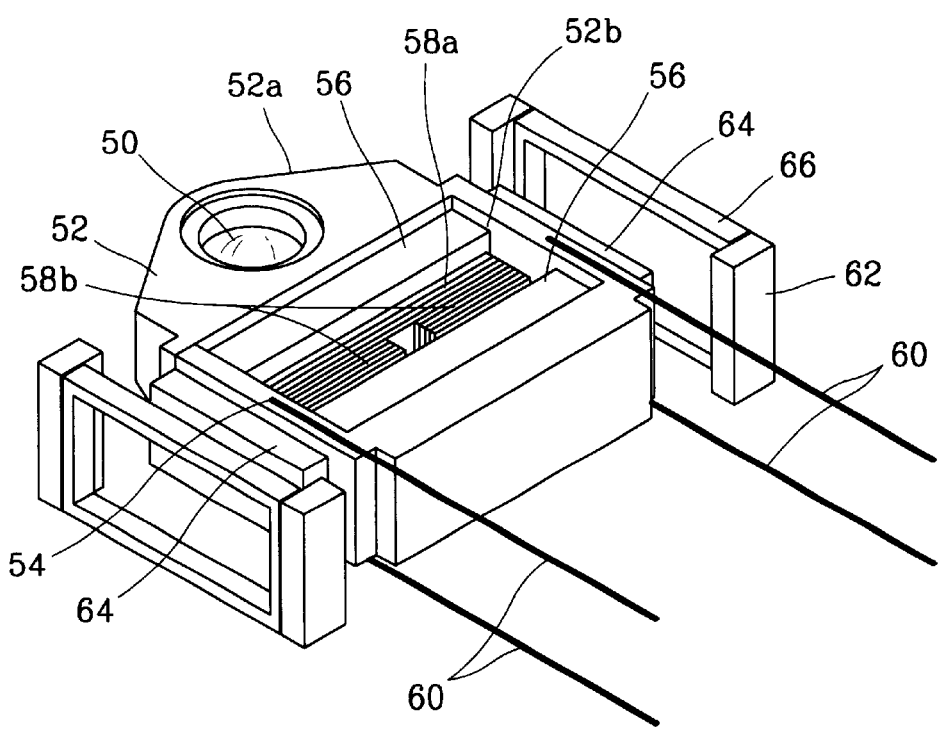
FIG. 8 is a perspective view illustrating an optical pickup actuator in accordance with a second embodiment of the present invention.

FIG. 8 is a perspective view illustrating an optical pickup actuator in accordance with a second embodiment of the present invention. Parts same with the parts of the first embodiments have the same reference numeral, and the overlapped description will be abridged.

The optical actuator in accordance with the second embodiment of the present invention includes a pair of magnets 56 installed inside the hole 52a at the center portion of the lens holder 52 so as to be corresponded each other and magnetized so as to form a multipolar magnetization in the upper and lower directions, a focusing coil 58a parallel placed between the pair of magnets 56 and for the focusing and a plurality of tilt coils 58b divided in the right and the left sides for radial tilt.

Herein, the focusing coil 58a and the plurality of tilt coils 58b are fixed to the pickup base.

In addition, the optical actuator in accordance with the second embodiment of the present invention further includes tracking magnets 64 respectively installed at the right and the left sides of the lens holder 52 and tracking coils 66 installed at the outside so as to be corresponded to the magnets 64.

Figure 9A:
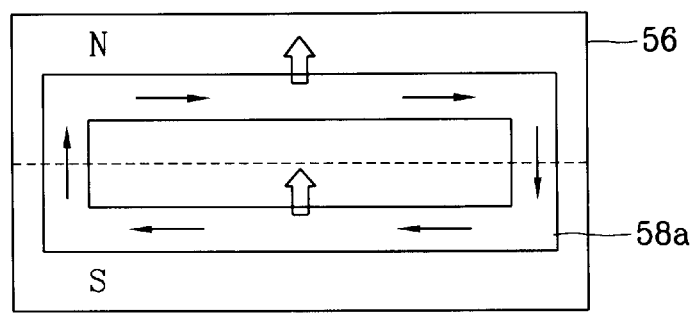
FIGS. 9A and 9B illustrate a focusing and a tracking movements of the optical pickup actuator of FIG. 8.
Figure 9B:
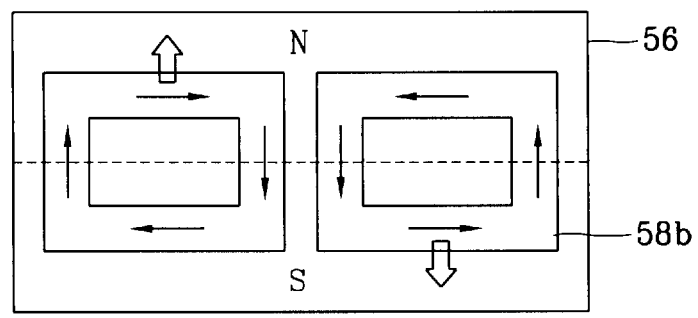

As depicted in FIGS. 8, 9A and 9B, the pair of magnets 56 fixed to the upper and lower surfaces of the center portion of the lens holder 52 are magnetized to form a multipolar magnetization in the upper and lower directions and form a unipolar magnetization in the front and rear directions and generate power in the upper and lower directions according to the current direction flowing on the focusing coil 58a. The focusing movement of the lens holder 52 is described in FIG. 9A.

And, when current is applied to the plurality of tilt coils 58b divided into the right and left portions so as to be parallel with the pair of magnets 56 in different directions, as depicted in FIG. 9B, the right and the left tilt coils generate power in different directions, power in the radial tilt direction can be generated.

Accordingly, the lens holder 52 can perform the focusing movement in the upper and lower directions by the focusing coil 58a with the pair of magnets 56 fixed to the upper and lower sides of the center portion and perform the tilt movement in the different upper and lower directions by the tilt coils 58b.

In addition, the tracking movement can be performed by the tracking coils 66 fixed to the right and left sides of the lens holder 52 and the magnet 64 opposed to it.

Figure 10:
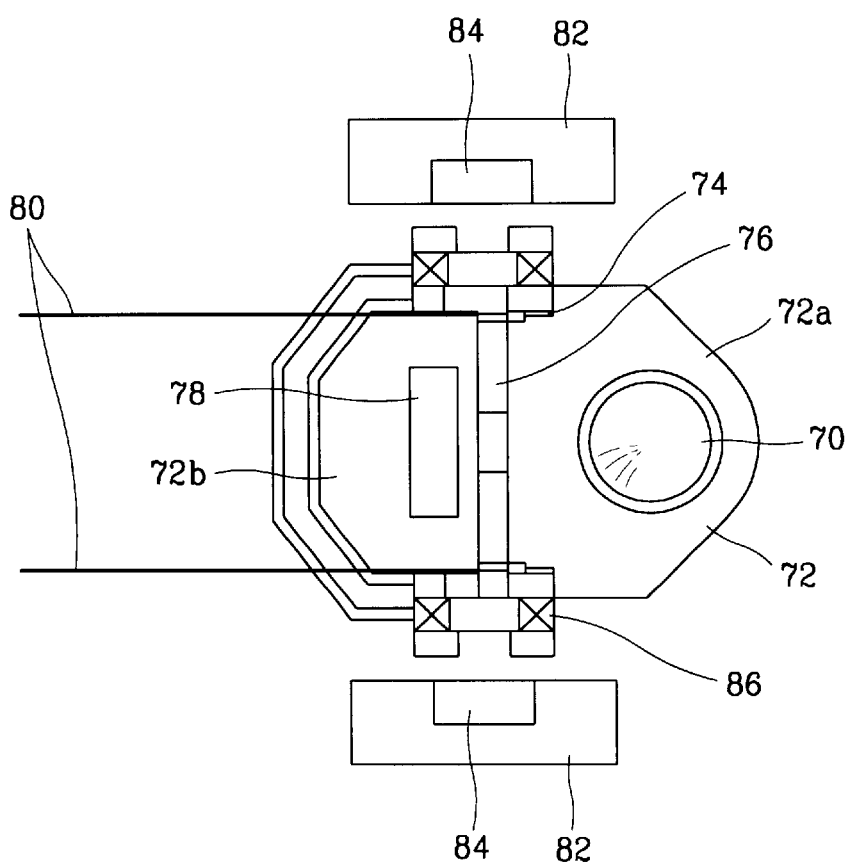
FIG. 10 is a plan view illustrating an optical pickup actuator in accordance with a third embodiment of the present invention.

FIG. 10 is a plan view illustrating an optical pickup actuator in accordance with a third embodiment of the present invention.

The optical pickup actuator in accordance with the third embodiment of the present invention includes a lens holder 72, an object lens 70 of the lens holder 72 focusing an optical beam from the light source in an information recording surface, focusing coils 76 fixed inside a hole 72b of the lens holder 72 and performing the focusing movement and a first magnet 78 fixed to a pickup base (not shown), placed inside the hole 72b of the lens holder 72 and operating mutually with the focusing coils 76.

In addition, the optical pickup actuator in accordance with the third embodiment of the present invention further includes tracking coils 86 wound around the right and the left sides of the lens holder 72 and performing the tracking movement, second magnets 84 installed so as to be corresponded to the tracking coils 86 and yokes 82 in which the magnets 84 are fixed.

Figure 11A:
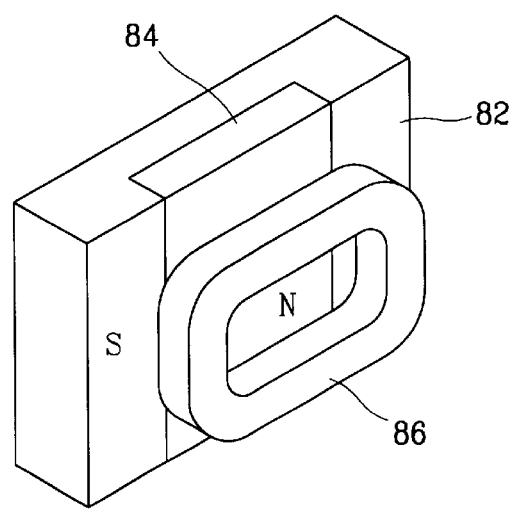
FIGS. 11a and 11B illustrate a tracking movement of the optical pickup actuator of FIG. 10.
Figure 11B:
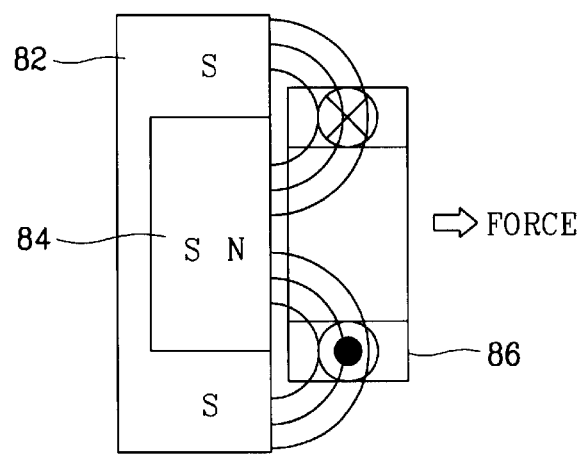

As depicted in FIGS. 10, 11A and 11B, in the optical pickup actuator in accordance with the third embodiment of the present invention, the object lens 70 is mounted the protrusion portion 72a if the lens holder 72, the focusing coils 76 for the focusing and the tile movements are installed by being divided into the right and the left portions, and the tracking coils 86 are installed at the right and the left sides so as to be corresponded to the track direction.

And, the first magnet 78 is fixed to the pickup base inside the hole 72b of the lens holder 72, and the second magnets 84 and the yokes 82 corresponded to the tracking coils 76 are installed at the outside of the lens holder 72.

As depicted in FIG. 6A in accordance with the first embodiment, the first magnet 78 is magnetized in order to form a multipolar magnetization in the upper and lower directions and the front and rear directions, the focusing and tilt magnetic circuit are constructed so as to be corresponded to the upper and lower surfaces of the pair of focusing coils 76, accordingly the lens holder 72 is moved in the focusing or tilting directions according to the direction and magnitude of the current applied to the focusing coils 76.

And, as depicted in FIGS. 11a and 11B, in the operation of the tracking magnetic circuit constructed with the tracking coils 86 fixed to the right and left sides of the lens holder 702 and the second magnets 84 corresponded to them, the yoke 82 is magnetized as a 'S' polar by the second magnet 84 magnetized as a 'NS' polar, and the tracking coil 86 is placed so as to coincide with the separation point of the magnetic polar between the first magnet 84 and the yoke 82.

Herein, a line of magnetic flux interlinks the tracking coil 86 placed at the separation point of the magnetic polar by passing through the yoke 82 from the second magnet 84. Accordingly, the line of magnetic flux is generated at the same time in a direction parallel with the magnetic polar surface of the second magnet 84 and a direction returned between the magnetic polar. By using the parallel direction of the line of magnetic flux, the tracking movement is performed by generating the driving force in the right and left directions according to the direction of the current flowing on the tracking coil 86 placed at the separation point between the magnetic polar.

In the optical pickup actuator in accordance with the third embodiment of the present invention, the magnetic circuit for the focusing and tilt movements is constructed at the center portion of the lens holder, the tracking magnetic circuit is constructed at the right and left sides of the lens holder so as to be corresponded to the track, accordingly a disc can be accessed accurately by each servo.

In the optical pickup actuator in accordance with the present invention, a magnetic circuit for the focusing and tilt movements is installed at the center portion of the lens holder, a magnetic circuit for tracking is constructed at the right and left sides of the lens holder, accordingly the number of parts can be reduced and it is possible to construct a thin actuator.

In addition, in the optical pickup actuator in accordance with the first and the second embodiment of the present invention, by placing the magnet at the moving part, a resonance point of the lens holder is enlarged, the excitation focus point of the focusing, tracking and tilt are coincided at one point, accordingly it facilitates the design of the moving part such as the lens holder, etc. and it is possible to improve the resonance characteristics of according to the resonance movement of the support portion.

And, in the optical pickup actuator in accordance with the present invention, by installing the focusing and the tilt magnetic circuit so as to be parallel with the track direction, nonlionearity of the operating force of the radial tilt besides the focusing and the tracking can be improved.

In addition, in the optical pickup actuator in accordance with the third embodiment of the present invention, the tracking magnetic circuit is used in a magnetic flux direction different from the conventional used magnetic flux direction, accordingly a magnetic circuit efficiency besides the thin structure high sensitiveness characteristics and linearity characteristics of the actuator can be improved.

What is claimed is:

1. An optical pickup actuator, comprising:
   a lens holder with an object lens for focusing an optical beam onto an information recording surface of an optical disc and having a hole at a center portion;
   focusing/tilt operating means installed inside the hole of the lens holder and generating a magnetic force so as to operate the lens holder in a focusing direction and a radial tilt direction, wherein the focusing/tilt operating means is constructed with a pair of first magnets fixed inside the hole of the lens holder and a pair of focusing coils fixed to a pickup base, projected into the hole of the lens holder and mutually operating with the pair of first magnets, and wherein when a current flows to the pair of focusing coils in the same direction, a movement of the lens holder in the focusing direction is performed, and when a current flows to the pair of focusing coils in different directions, a movement of the lens holder in the radial tilt direction is performed; and tracking operating means respectively installed at the right and the left sides of the lens holder and generating magnetic force in order to operate the lens holder in a tracking direction.

2. The optical pickup actuator according to claim 1, wherein each of the pair of first magnets faces each other inside the hole of the lens holder and is installed so as to be parallel with the track direction.

3. The optical pickup actuator according to claim 2, wherein the pair of focusing coils is divided into the right and left directions between the pair of first magnets.

4. The optical pickup actuator according to claim 3, wherein the pair of focusing coils is formed so as to have a rectangular ring shape.

5. The optical pickup actuator according to claim 3, wherein the pair of focusing coils is parallel-connected to each other and independently generate power in the upper and lower directions in accordance with applied power.

6. The optical pickup actuator according to claim 1, wherein the tracking operating means is constructed with a plurality of second magnets respectively fixed to the right and left sides of the lens holder and a plurality of tracking coils installed at a yoke of the pickup base so as to be corresponded to the plurality of second magnets.

7. The optical pickup actuator according to claim 6, wherein the second magnets are magnetized to form a unipolar magnetization.

8. The optical pickup actuator according to claim 6, wherein each tracking coil is formed so as to have a rectangular ring shape and has a size to be inserted by the second magnet.

9. An optical pickup actuator comprising:

a lens holder with an object lens for focusing an optical beam onto an information recording surface of an optical disc and having a hole at a center portion;

focusing/tilt operating means installed inside the hole of the lens holder and generating a magnetic force so as to operate the lens holder in a focusing and a tilt direction; and tracking operating means respectively installed at the right and the left sides of the lens holder and generating magnetic force in order to operate the lens holder in a tracking direction, wherein the focusing/tilt operating means is constructed with a first magnet fixed inside the hole of the lens holder and a focusing coil fixed to a pickup base, projected into the hole of the lens holder and mutually operating with the first magnet, the first magnet is constructed as a pair, faces each other inside the hole of the lens holder and is installed so as to be parallel with the track direction, the focusing coil is constructed as a pair divided into the right and left directions between the pair of first magnets, and the pair of first magnets is magnetized so as to form a multipolar magnetization in the upper and lower directions, are magnetized in the front and rear and generate line of magnetic flux in different directions by the pair of focusing coils corresponded in the right and left directions.

10. An optical pickup actuator, comprising:

a lens holder with an object lens for focusing an optical beam onto an information recording surface of an optical disc and having a hole at a center portion;

focusing/tilt operating means installed inside the hole of the lens holder and generating a magnetic force so as to operate the lens holder in a focusing and a tilt direction; and tracking operating means respectively installed at the right and the left sides of the lens holder and generating magnetic force in order to operate the lens holder in a tracking direction, wherein the tracking operating means is constructed with a plurality of second magnets respectively fixed to the right and left sides of the lens holder and a plurality of tracking coils installed at a yoke of a pickup base so as to be corresponded to the plurality of second magnets and the focusing/tilt operating means is constructed with a first magnet fixed inside the hole of the lens holder and a focusing coil fixed to a pickup base and projected into the hole of the lens holder in order to operate mutually with the first magnet.

* * * * *